(12) United States Patent
Habaue et al.

(10) Patent No.: US 7,718,757 B2
(45) Date of Patent: May 18, 2010

(54) AROMATIC POLYMER AND PRODUCING METHOD THEREOF

(75) Inventors: Shigeki Habaue, Yonezawa (JP); Soichiro Murakami, Yonezawa (JP); Hideyuki Higashimura, Tsukuba (JP)

(73) Assignee: Sumitomo Chemical Company Limited, Tokyo (JP)

( * ) Notice: Subject to any disclaimer, the term of this patent is extended or adjusted under 35 U.S.C. 154(b) by 29 days.

(21) Appl. No.: 11/920,168

(22) PCT Filed: May 8, 2006

(86) PCT No.: PCT/JP2006/309272

§ 371 (c)(1),
(2), (4) Date: Nov. 9, 2007

(87) PCT Pub. No.: WO2006/121020

PCT Pub. Date: Nov. 16, 2006

(65) Prior Publication Data

US 2009/0105445 A1 Apr. 23, 2009

(30) Foreign Application Priority Data

May 9, 2005 (JP) ............................. 2005-136728

(51) Int. Cl.
*C08G 65/38* (2006.01)
*C08G 63/00* (2006.01)

(52) U.S. Cl. ................... 528/219; 568/301; 568/323; 568/335

(58) Field of Classification Search .............. 528/219; 568/301, 323, 335
See application file for complete search history.

(56) References Cited

FOREIGN PATENT DOCUMENTS

| JP | 2005-314273 A | 11/2005 |
|---|---|---|
| JP | 2005-314274 A | 11/2005 |

OTHER PUBLICATIONS

Habaue et al., "Oxidative Coupling Polymerization of 2,3-Dihydroxynaphthalene with Dinuclear-Type Copper(II) Catalyst", Journal of Polymer Science: Part A: Polymer Chemistry, vol. 43, (2005) pp. 1635-1640.
Taqaya et al., Chemistry and Chemical Industry, vol. 56-9, (2003), pp. 967-968.
Habaue et al., "Asymmetric Oxidative Coupling Polymerization of Optically Active Tetrahydroxybinaphthalene Derivative", Macromolecules vol. 35, (2002), pp. 2437-2439.
Habaue et al., "Copper(I)-Catalyzed Asymmetric Oxidative Coupling Polymerization of 2,3Dihydroxynaphthalene Using Bisoxazoline Ligands", Macromolecules vol. 36 (2003) pp. 2604-2608.

*Primary Examiner*—Terressa M Boykin
(74) *Attorney, Agent, or Firm*—Birch, Stewart, Kolasch & Birch, LLP

(57) ABSTRACT

An aromatic polymer, containing a repeating unit represented by Formula (I), and having properties (A1) and (B1): (A1) the number average degree of polymerization of an acetylated product obtained by acetylation of the hydroxyl groups of the polymer is 3 or more, and (B1) at a wavelength where an absolute value of molar ellipticity (degree·cm$^{-2}$·dmol$^{-1}$) per mole of the repeating unit of the acetylated product in a circular dichroism spectrum of the acetylated product reaches maximum in a wavelength range of from 200 to 350 nm, the absolute value is 50,000 or more:

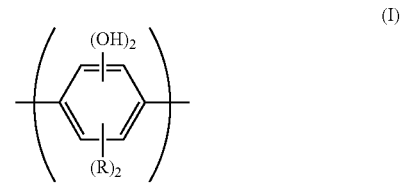

wherein R represents a hydrocarbon, hydrocarbon-oxy, hydrocarbon-mercapto or hydrocarbon-amino group that may be substituted; the two R's may bind to each other to form a ring; and the repeating unit represented by Formula (I) has no symmetrical plane that has two binding sites and that is perpendicular for the benzene ring.

12 Claims, No Drawings

AROMATIC POLYMER AND PRODUCING METHOD THEREOF

TECHNICAL FIELD

The present invention relates to a new optically active aromatic polymer and a producing method thereof.

BACKGROUND ART

Aromatic polymers are excellent in properties such as chemical stability and mechanical strength, and also in electrical, optical and magnetic characteristics. Therefore, they are now materials indispensable in the fields of high technology.

An aromatic polymer having optical activity and a repeating unit represented by Formula (A) as one showing better performance, was found (see Macromolecules, 2002, 35, pp. 2437 to 2439). The polymer is a polymer in which a hydroxyl group is substituted on each aromatic ring. Recently, an optically active polymer comprising a repeating unit having two hydroxyl groups on one aromatic ring, as shown in Formula (B), was also reported (see Macromolecules, 2003, 36, pp. 2604 to 2608). As for an absolute value of molar ellipticity at a wavelength of approximately 230 nm per mole of the repeating unit of the polymer having the acetylated hydroxyl group(s) (degree·cm$^{-2}$·dmol$^{-1}$), among the polymer represented by Formula (A), there are some polymers having the absolute value of 102,000. With respect to the polymer represented by Formula (B), the upper limit of the absolute value is 43,000 or less.

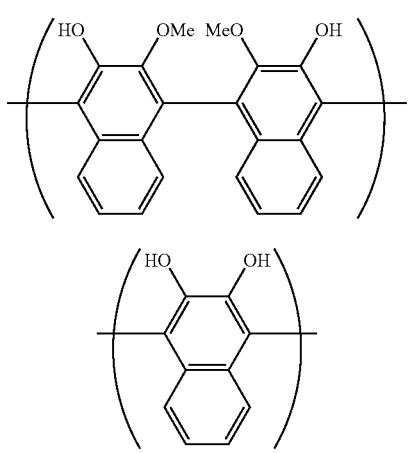

DISCLOSURE OF INVENTION

An object of the present invention is to provide a new highly optically active aromatic polymer having two hydroxyl groups on each aromatic ring. In addition, another object is to provide a producing method thereof.

According to the present invention, there is provided the following means:

(1) An aromatic polymer, comprising a repeating unit represented by Formula (I), wherein the polymer has the following properties (A1) and (B1):

(A1) the number average degree of polymerization of an acetylated product obtained by acetylation of the hydroxyl groups of the polymer is 3 or more, and (B1) at a wavelength where an absolute value of molar ellipticity (degree·cm$^{-2}$·dmol$^{-1}$) per mole of the repeating unit of the acetylated product in a circular dichroism spectrum of the acetylated product reaches maximum in a wavelength range of from 200 to 350 nm, the absolute value is 50,000 or more:

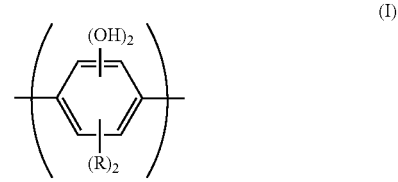

wherein R represents a hydrocarbon group that may be substituted, a hydrocarbon-oxy group that may be substituted, a hydrocarbon-mercapto group that may be substituted, or a hydrocarbon-amino group that may be substituted; the two R's may be the same or different from each other, or alternatively may bind to each other to form a ring; and the repeating unit represented by Formula (I) has no symmetrical plane that has two binding sites and that is perpendicular for the benzene ring;

(2) An acetylated product, comprising a repeating unit represented by Formula (Ia), wherein the acetylated product has the following properties (A2) and (B2):

(A2) the number average degree of polymerization is 3 or more, and (B2) at a wavelength where an absolute value of molar ellipticity (degree·cm$^{-2}$·dmol$^{-1}$) per mole of the repeating unit of the acetylated product in a circular dichroism spectrum reaches maximum in a wavelength range of from 200 to 350 nm, the absolute value is 50,000 or more:

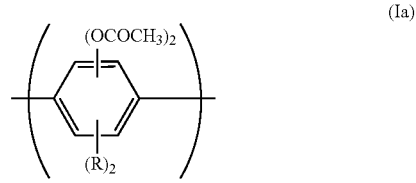

wherein R represents a hydrocarbon group that may be substituted, a hydrocarbon-oxy group that may be substituted, a hydrocarbon-mercapto group that may be substituted, or a hydrocarbon-amino group that may be substituted; the two R's may be the same or different from each other, or alternatively may bind to each other to form a ring; and the repeating unit represented by Formula (Ia) has no symmetrical plane that has two binding sites and that is perpendicular for the benzene ring;

(3) A method of producing the aromatic polymer as described in the above item (1), which comprises oxidatively polymerizing an aromatic compound represented by Formula (V) with oxygen, by using a complex as a catalyst, wherein the complex comprises a compound represented by Formula (VI), (VII), (VIII) or (IX) and a vanadium compound:

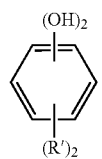

(V)

wherein R' has the same meaning as that of R in formula (I);

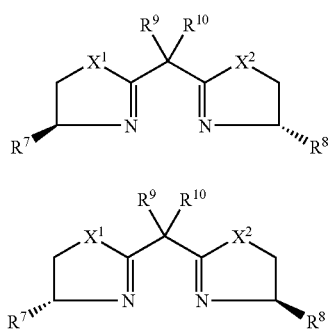

wherein, in formulae (VI) and (VII), $R^7$ and $R^8$ each represent a hydrocarbon group that may be substituted; $R^7$ and $R^8$ may be the same or different from each other; $R^9$ and $R^{10}$ each represent a hydrocarbon group that may be substituted; $R^9$ and $R^{10}$ may be the same or different from each other; $X^1$ and $X^2$ each represent an oxygen or sulfur atom; and $X^1$ and $X^2$ may be the same or different from each other; and

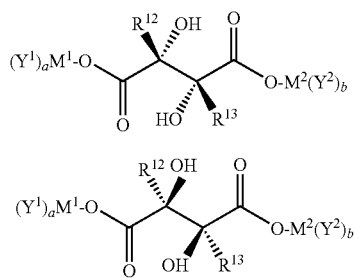

wherein, in formulae (VIII) and (IX), $R^{12}$ and $R^{13}$ each represent a hydrogen atom or a hydrocarbon group that may be substituted; $R^{12}$ and $R^{13}$ may be the same or different from each other; $M^1$ and $M^2$ each represent a metal ion; $M^1$ and $M^2$ may be the same or different from each other; $Y^1$ and $Y^2$ each represent a counter anion; $Y^1$ and $Y^2$ may be the same or different from each other; a and b each are an integer of 0 or more; and a and b may be the same or different from each other; and (4) The aromatic polymer as described in the above item (1), which is produced by the method as described in the above item (3).

Other and further features and advantages of the invention will appear more fully from the following description.

BEST MODE FOR CARRYING OUT THE INVENTION

The aromatic polymer of the present invention is an aromatic polymer comprising a repeating unit represented by Formula (I), and having the following properties (A1) and (B1):

(A1) the number average degree of polymerization of an acetylated product obtained by acetylation of the hydroxyl groups of the polymer is 3 or more, and (B1) at a wavelength where an absolute value of molar ellipticity (degree·cm$^{-2}$·dmol$^{-1}$) per mole of the repeating unit of the acetylated product in a circular dichroism spectrum of the acetylated product reaches maximum in a wavelength range of from 200 to 350 nm, the absolute value is 50,000 or more.

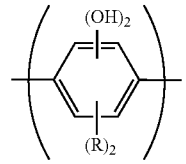

(I)

(In Formula (I), R represents a hydrocarbon group that may be substituted, a hydrocarbon-oxy group that may be substituted, a hydrocarbon-mercapto group that may be substituted, or a hydrocarbon-amino group that may be substituted; the two R's may be the same or different from each other, or alternatively may bind to each other to form a ring; and the repeating unit represented by Formula (I) has no symmetrical plane that has two binding sites and that is perpendicular for the benzene ring.)

R in Formula (I) represents a hydrocarbon group that may be substituted, a hydrocarbon-oxy group (a hydrocarbyloxy group) that may be substituted, a hydrocarbon-mercapto group (a hydrocarbylmercapto group) that may be substituted, or a hydrocarbon-amino group (a hydrocarbylamino group) that may be substituted. The two R's may be the same or different from each other, or alternatively may bind to each other to form a ring. Presence of such a group R causes rotational inhibition around the bond axis of the repeating unit represented by Formula (I), allowing expression of the high optical activity of the present invention.

As R in Formula (I), preferred specific examples of the hydrocarbon group include an alkyl group having approximately 1 to 50 carbon atoms (more preferably approximately 1 to 30 carbon atoms, and further preferably approximately 1 to 20 carbon atoms, and particularly preferably approximately 1 to 10 carbon atoms) such as a methyl group, an ethyl group, a propyl group, an isopropyl group, a butyl group, an isobutyl group, a t-butyl group, a pentyl group, a hexyl group, a nonyl group, a dodecyl group, a pentadecyl group, an octadecyl group, and a docosyl group; a cyclic saturated hydrocarbon group having approximately 3 to 50 carbon atoms (more preferably approximately 3 to 30 carbon atoms, further preferably approximately 3 to 20 carbon atoms, and particularly preferably approximately 3 to 10 carbon atoms) such as a cyclopropyl group, a cyclobutyl group, a cyclobutyl group, a cyclopentyl group, a cyclohexyl group, a cyclononyl group, a cyclododecyl group, a norbornyl group, and an adamantyl group; an alkenyl group having approximately 2 to 50 carbon atoms (more preferably approximately 2 to 30 carbon atoms, further preferably approximately 2 to 20 carbon atoms, and particularly preferably approximately 2 to 10 carbon atoms)

such as an ethenyl group, a propenyl group, a 3-butenyl group, a 2-butenyl group, a 2-pentenyl group, a 2-hexenyl group, a 2-nonenyl group, and a 2-dodecenyl group; an aryl group having approximately 6 to 50 carbon atoms (more preferably approximately 6 to 30 carbon atoms, further preferably approximately 6 to 20 carbon atoms, and particularly preferably approximately 6 to 12 carbon atoms) such as a phenyl group, a 1-naphthyl group, a 2-naphthyl group, a 2-methylphenyl group, a 3-methylphenyl group, a 4-methylphenyl group, a 4-ethylphenyl group, a 4-propylphenyl group, a 4-isopropylphenyl group, a 4-butylphenyl group, a 4-t-butylphenyl group, a 4-hexylphenyl group, a 4-cyclohexylphenyl group, a 4-adamantylphenyl group, and a 4-phenylphenyl group; and an aralkyl group having approximately 7 to 50 carbon atoms (more preferably approximately 7 to 30 carbon atoms, further preferably approximately 7 to 20 carbon atoms, and particularly preferably approximately 7 to 12 carbon atoms) such as a phenylmethyl group, a 1-phenyleneethyl group, a 2-phenylethyl group, a 1-phenyl-1-propyl group, a 1-phenyl-2-propyl group, a 2-phenyl-2-propyl group, a 1-phenyl-3-propyl group, a 1-phenyl-4-butyl group, a 1-phenyl-5-pentyl group, and a 1-phenyl-6-hexyl group. When the two R's do not form a ring, the hydrocarbon group is preferably an alkyl group, a cyclic saturated hydrocarbon group, an aryl group, or an aralkyl group; more preferably an alkyl group, a cyclic saturated hydrocarbon group, or an aryl group; further preferably a methyl group, an ethyl group, a propyl group, an isopropyl group, a butyl group, a t-butyl group, a cyclohexyl group, a phenyl group, a 1-naphthyl group, or a 2-naphthyl group.

The hydrocarbon-oxy group is a group in which a hydroxyl group is substituted with the hydrocarbon group described above, and specific examples and preferable examples of the hydrocarbon group are the same as those described above.

The hydrocarbon-mercapto group is a group in which a mercapto group is substituted with the hydrocarbon group described above, and specific examples and preferable examples of the hydrocarbon group are the same as those described above.

The hydrocarbon-amino group is a group in which an amino group is substituted with one or two hydrocarbon groups described above, and specific examples and preferable examples of the hydrocarbon groups are the same as those described above.

With respect to R in Formula (I), when the two R's bind to each other to form a ring, the two R's are bound directly to each other while a hydrogen atom is eliminated from each of the R's. Specific examples thereof include —$(CH_2)_3$—, —$(CH_2)_4$—, —$(CH_2)_5$—, —$CH_2$—$CH$=$CH$—, —$CH_2$—$CH$=$CH$—$CH_2$—, —$CH_2$—$CH_2$—$CH$=$CH$—, —$CH$=$CH$—$CH$=$CH$—, —$CH$=$C(CH_3)$—$CH$=$CH$—, —$CH$=$C(CH_2CH_3)$—$CH$=$CH$—, —$CH$=$C(CH_2CH_2CH_3)$—$CH$=$CH$—, —$CH$=$C(CH(CH_3)_2)$—$CH$=$CH$—, —$CH$=$C(C(CH_3)_3)$—$CH$=$CH$—, —$CH$=$C(C_6H_5)$—$CH$=$CH$—, —$C(CH_3)$=$CH$—$CH$=$CH$—, —$C(CH_3)$=$CH$—$C(CH_3)$=$CH$—, —$C(CH_3)$=$CH$—$CH$=$C(CH_3)$—, —$CH$=$C(CH_3)$—$C(CH_3)$=$CH$—, —$CH_2$—$CH_2$—$O$—, —$CH_2$—$O$—$CH_2$—, —$CH_2$—$CH_2$—$CH_2$—$O$—, —$CH_2$—$CH_2$—$O$—$CH_2$—, —$O$—$CH_2$—$CH_2$—$O$—, —$CH$=$CH$—$O$—, —$CH$=$C(CH_3)$—$O$—, —$CH$=$CH$—$S$—, —$CH$=$CH$—$NH$— and —$CH$=$CH$—$N(CH_3)$—. Preferable are groups having 3 to 20 carbon atoms; more preferable are groups having 4 to 12 carbon atoms and forming a fused ring; and further preferable are hydrocarbon groups having 4 to 12 carbon atoms and forming a naphthalene ring by annulation.

When R in Formula (I) represents a hydrocarbon group, a hydrocarbon-oxy group, a hydrocarbon-mercapto group or a hydrocarbon-amino group, each of which is substituted with a substituent, examples of the substituent include a halogen atom, a hydroxyl group, a mercapto group, an amino group, a hydrocarbon-oxy group that may be substituted, a hydrocarbon-mercapto group that may be substituted, and a hydrocarbon-amino group that may be substituted.

The halogen atom is a fluorine atom, a chlorine atom, a bromine atom, or an iodine atom; preferably a fluorine atom, a chlorine atom, or a bromine atom; and more preferably a fluorine atom.

The substituent is preferably a halogen atom, a hydrocarbon-oxy group that may be substituted, a hydrocarbon-mercapto group that may be substituted, a hydrocarbon-amino group that may be substituted, or a hydrocarbon-phosphino group that may be substituted; more preferably a halogen atom, a hydrocarbon-oxy group that may be substituted, or a hydrocarbon-amino group that may be substituted; and further preferably a halogen atom or a hydrocarbon-oxy group that may be substituted.

In Formula (I), the individual repeating unit must not have a symmetrical plane that has two binding sites and that is perpendicular for the benzene ring.

The repeating unit represented by Formula (I) is preferably a repeating unit represented by any one of Formulae (II) to (IV), more preferably a repeating unit represented by Formula (II) or (III), and further preferably a repeating unit represented by Formula (II).

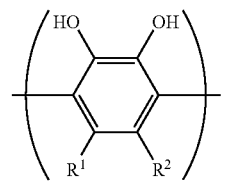

(II)

(In Formula (II), $R^1$ and $R^2$ each represent a hydrocarbon group that may be substituted, a hydrocarbon-oxy group that may be substituted, a hydrocarbon-mercapto group that may be substituted, or a hydrocarbon-amino group that may be substituted; and $R^1$ and $R^2$ are different from each other, or alternatively may bind to each other to form a ring.)

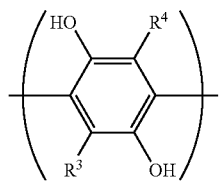

(III)

(In Formula (III), $R^3$ and $R^4$ each represent a hydrocarbon group that may be substituted, a hydrocarbon-oxy group that may be substituted, a hydrocarbon-mercapto group that may be substituted, or a hydrocarbon-amino group that may be substituted; and $R^3$ and $R^4$ are different from each other.)

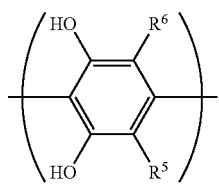

(IV)

(In Formula (IV), $R^5$ and $R^6$ each represent a hydrocarbon group that may be substituted, a hydrocarbon-oxy group that may be substituted, a hydrocarbon-mercapto group that may be substituted, or a hydrocarbon-amino group that may be substituted; and $R^5$ and $R^6$ are different from each other.)

Specific examples and preferable examples of the hydrocarbon group that may be substituted, the hydrocarbon-oxy group that may be substituted, the hydrocarbon-mercapto group that may be substituted and the hydrocarbon-amino group that may be substituted for $R^1$ and $R^2$ in Formula (II) are the same as those for R in Formula (I).

Specific examples and preferable examples of the hydrocarbon group that may be substituted, the hydrocarbon-oxy group that may be substituted, the hydrocarbon-mercapto group that may be substituted and the hydrocarbon-amino group that may be substituted for $R^3$ to $R^6$ in Formulae (III) and (IV) are the same as those for R in Formula (I) in the case that the two R's do not form a ring.

The aromatic polymer of the present invention may have a structure other than the repeating unit represented by Formula (I), In this case, the ratio of the repeating unit represented by Formula (I) in the polymer is preferably 80 unit % or more, more preferably 90 unit % or more, and further preferably 95 unit % or more.

The aromatic polymer of the present invention has the above-described properties (A1) and (B1).

In (A1) and (B1), the method of acetylating the hydroxyl groups of the polymer is not particularly limited, so far as substantially all hydroxyl groups are to be acetylated. It is preferable that the method is conducted in the presence of a large excess of acetyl chloride and pyridine under inert gas atmosphere. The amounts of acetyl chloride and pyridine to be used each are preferably 1 to 1,000 times, more preferably 2 to 100 times, and further preferably 3 to 10 times, larger by mole than the molar number of the repeating unit represented by Formula (I). The reaction temperature is preferably −50 to 100° C., more preferably 0 to 80° C., and further preferably 10 to 60° C. The reaction time is preferably 0.1 hour to 1,000 hours, more preferably 1 hour to 100 hours, and further preferably 5 hours to 25 hours. When the polymer cannot be dissolved, a solvent inert to acetyl chloride under the reaction condition may be coexistent, and examples thereof include benzene, toluene, xylene, chlorobenzene, dichlorobenzene, dichloromethane, chloroform, acetonitrile, benzonitrile, dioxane, tetrahydrofuran, ethylene glycol dimethylether, N,N-dimethylformamide, N-methylpyrrolidone, nitromethane, and nitrobenzene.

The thus-obtained acetylated product has the repeating unit represented by Formula (Ia).

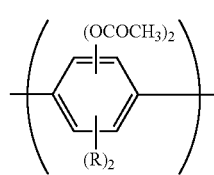

(Ia)

(In formula (Ia), R has the same meaning as that in Formula (I), and the repeating unit represented by Formula (Ia) has no symmetrical plane that has two binding sites and that is perpendicular for the benzene ring.)

Under the condition (A2), the number average degree of polymerization of the acetylated product is a value obtained by dividing the number-average molecular weight of the acetylated product with the molecular weight of the repeating unit represented by Formula (Ia). The number-average molecular weight is determined by gel-permeation chromatographic analysis as a value equivalent to polystyrene. The number average degree of polymerization is 3 or more, preferably 3 to 10,000, more preferably 4 to 5,000, and further preferably 5 to 1,000.

Under the condition (B2), when the molar ellipticity per mole of the repeating unit of the acetylated product is designated as [θ] (degree·cm$^{-2}$·dmol$^{-1}$), [θ] is a value calculated according to the following equation.

$$[\theta] = \theta \cdot m/(w \cdot d)$$

(In the equation, θ represents the ellipticity of a sample solution (degree); w represents the amount of the acetylated product (gram) in 10 cm$^3$ of the sample solution; m represents the molecular weight of the repeating unit represented by Formula (Ia) in the acetylated product; and d represents the optical path length (cm).)

At a wavelength where an absolute value of molar ellipticity (degree·cm$^{-2}$·dmol$^{-1}$) reaches maximum in a wavelength range of 200 to 350 nm, the absolute value is 50,000 or more. The maximum absolute value is preferably 55,000 or more, more preferably 60,000 or more, and further preferably 65,000 or more. The upper limit of the value is not particularly limited, but it is normally 100,000,000, preferably 1,000,000, more preferably 500,000, and further preferably 300,000.

The fact that the maximum absolute value of the molar ellipticity in the wavelength range of 200 to 350 nm is significantly large in the present invention indicates that the repeating unit represented by Formula (I) or (Ia) has extremely large optical activity with respect to the bond axis.

The method of producing the aromatic polymer of the present invention is not particularly limited, but is preferably to oxidatively polymerize an aromatic compound represented by Formula (V) with oxygen, by using a complex comprising a compound represented by Formula (VI), (VII), (VIII) or (IX) and a vanadium compound (including simple vanadium in the present invention) as a catalyst.

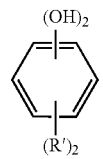

(V)

(In formula (V), R' has the same meaning as that of R in Formula (I).)

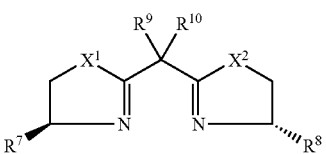

(VI)

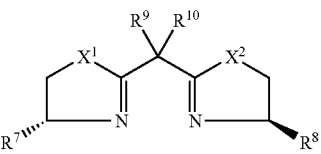

(VII)

(In formulae (VI) and (VII), $R^7$ and $R^8$ each represent a hydrocarbon group that may be substituted; $R^7$ and $R^8$ may be the same or different from each other; $R^9$ and $R^{10}$ each represent a hydrocarbon group that may be substituted; $R^9$ and $R^{10}$ may be the same or different from each other; $X^1$ and $X^2$ each represent an oxygen or sulfur atom; and $X^1$ and $X^2$ may be the same or different from each other.)

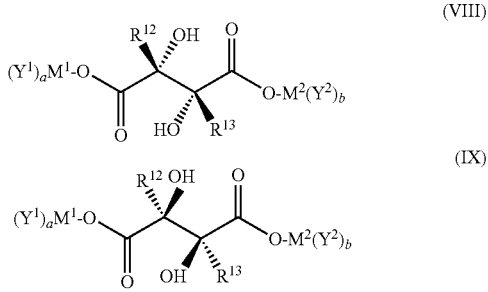

(In formulae (VIII) and (IX), $R^{12}$ and $R^{13}$ each represent a hydrogen atom or a hydrocarbon group that may be substituted; $R^{12}$ and $R^{13}$ may be the same or different from each other; $M^1$ and $M^2$ each represent a metal ion; $M^1$ and $M^2$ may be the same or different from each other; $Y^1$ and $Y^2$ each represent a counter anion; $Y^1$ and $Y^2$ may be the same or different from each other; a and b each are an integer of 0 or more; and a and b may be the same or different from each other.)

R' in Formula (V) has the same meaning as that of R in Formula (I), and the specific examples and the preferable examples are also the same.

When the aromatic compound represented by Formula (V) is used in combination with another aromatic compound, the blending ratio is not particularly limited, but the amount of the aromatic compound represented by Formula (V) in the polymer is preferably 80 mol % or more, more preferably 90 mol % or more, and more preferably 95 mol % or more, with respect to all monomers.

In the present invention, a complex comprising a compound represented by Formula (VI), (VII), (VIII) or (IX) and a vanadium compound is preferably used as the catalyst. In such a case, the compound represented by Formula (VI), (VII), (VIII) or (IX) is allowed to coordinate with the vanadium compound.

The hydrocarbon group for $R^7$ to $R^{11}$ in Formulae (VI) and (VII) has the same meaning as that of the hydrocarbon group in Formula (I) when the two R's do not form a ring, and specific examples thereof are also the same. A group that may be substituted on the hydrocarbon group is also the same as that described for Formula (I), and specific examples thereof are also the same.

Each of $R^7$ and $R^8$ in Formulae (VI) and (VII) is preferably a hydrocarbon group having 1 to 12 carbon atoms, more preferably a hydrocarbon group having 1 to 9 carbon atoms, and further preferably a methyl group, an ethyl group, a propyl group, an isopropyl group, a t-butyl group, or a phenyl group.

Each of $R^9$ and $R^{10}$ in Formulae (VI) and (VII) is preferably a hydrocarbon group having 1 to 12 carbon atoms, more preferably a hydrocarbon group having 1 to 6 carbon atoms, and further preferably a methyl group.

Both of $X^1$ and $X^2$ in Formulae (VI) and (VII) are preferably an oxygen atom or a sulfur atom, more preferably an oxygen atom.

The hydrocarbon group for $R^{12}$ and $R^{13}$ in Formulae (VIII) and (IX) has the same meaning as that of the hydrocarbon group in Formula (I) when the two R's do not form a ring, and specific examples thereof are also the same. A group that may be substituted on the hydrocarbon group is also the same as that described for Formula (I), and specific examples thereof are also the same.

Each of $R^{12}$ and $R^{13}$ in Formulae (VIII) and (IX) is preferably a hydrogen atom or a hydrocarbon group having 1 to 6 carbon atoms, more preferably a hydrogen atom or a hydrocarbon group having 1 to 4 carbon atoms, and further preferably a hydrogen atom or a methyl group.

In formulae (VIII) and (IX), specific examples of the metal ion represented by $M^1$ and $M^2$ include ions of Li, Na, K, Rb, Cs, Be, Mg, Ca, Sr, Ba, Al, Ga, In, Tl, Pb, Sc, Ti, V, Cr, Mn, Fe, Co, Ni, Cu, Zn, Y, Zr, Nb, Mo, Tc, Ru, Rh, Ag, Cd, La, Ce, Sm, Eu, Hf, Ta, W, Re, Os, Ir, Pt, Au, Hg and the like. The metal ion is preferably an ion of Li, Na, K, Rb, Cs, Be, Mg, Ca, Sr or Ba; more preferably an ion of Li, Na, K, Rb or Cs; and further preferably and ion of Li, Na or K.

A conjugated base of Brønsted acid is generally used as a counter anion for $Y^1$ and $Y^2$ in Formulae (VIII) and (IX). Examples thereof include fluoride ion, chloride ion, bromide ion, iodide ion, sulfate ion, nitrate ion, ion carbonate, perchlorate ion, tetrafluoroborate ion, hexafluorophosphate ion, methanesulfonate ion, trifluoromethanesulfonate ion, toluenesulfonate ion, acetate ion, ion trifluoroacetate, ion propionate, ion benzoate, hydroxide ion, oxide ion, methoxide ion, and ethoxide ion. Preferable is chloride ion, bromide ion, iodide ion, sulfate ion, nitrate ion, acetate ion, hydroxide ion or methoxide ion; and more preferably is chloride ion, bromide ion, sulfate ion or nitrate ion.

a and b in Formulae (VIII) and (IX) are so selected that the compounds represented by Formulae (VIII) and (IX) become electrically neutral.

The vanadium compound is a compound containing zerovalent to pentavalent vanadium, preferably a compound containing trivalent to pentavalent vanadium, more preferably a vanadium (III) compound, a vanadium (IV) compound, an oxovanadium (IV) compound, or an oxovanadium (V) compound, and further preferably an oxovanadium (IV) compound or an oxovanadium (V) compound.

The vanadium compound has a counter anion in some cases, so that the compound becomes electrically neutral. Specific examples and preferable examples of the counter anions are the same as those for the counter anion of $Y^1$ and $Y^2$ in Formulae (VIII) and (IX).

The vanadium compound may have other ligand compounds, in addition to the vanadium compound and the counter anion, in the range that does not inhibit complex formation. Examples of the other ligand compounds include hydrogen fluoride, hydrogen chloride, hydrogen bromide, hydrogen iodide, ammonia, water, hydrogen sulfide, carbonic acid, phosphoric acid, phosphorous acid, hydrogen cyanide, cyanic acid, thiocyanic acid, isothiocyanic acid, neutral molecules such as methanol, ethanol, propanol, isopropanol, ethylene glycol, phenol, catechol, methanethiol, ethanethiol, benzene thiol, 1,2-benzene dithiol, 1,2-ethanedithiol, 2-mercaptoethanol, ethylamine, triethylamine, ethylenediamine, ethanolamine, pyridine, imidazole, N-methylimidazole, acetic acid, propionic acid, benzoic acid, oxalic acid, citric acid, tartaric acid, trifluoroacetic acid, acetylacetone, 1,1,1,5,5,5-hexafluoroacetylacetone, glycine, imino diacetic acid, 8-hydroquinoline, acetone, acetonitrile, and benzonitrile; and anions obtained from the neutral molecules above by elimination of one or more protons. Preferred examples thereof include ammonia, water, methanol, ethanol, propanol, isopropanol, ethylene glycol, pyridine, imidazole, N-methylimidazole, acetic acid, propionic acid, benzoic acid, oxalic acid, citric acid, tartaric acid, trifluoroacetic acid, neutral molecules such as acetylacetone, 1,1,1,5,5,5-hexafluoroacetylacetone, acetone, acetonitrile and benzonitrile, and anions obtained from the neutral molecules above by elimination of one or more protons.

In forming the vanadium complex, a compound represented by Formula (VI), (VII), (VIII) or (IX) and the vanadium compound may be mixed, for example, in solvent at a temperature of from 0 to 200° C. Examples of the solvent include aromatic hydrocarbons such as benzene, toluene, and xylene; linear or cyclic aliphatic hydrocarbons such as heptane and cyclohexane; halogenated hydrocarbons such as chlorobenzene, dichlorobenzene, and dichloromethane; nitriles such as acetonitrile and benzonitrile; alcohols such as methanol, ethanol, n-propyl alcohol, and iso-propyl alcohol; ethers such as dioxane, tetrahydrofuran, and ethylene glycol dimethylether; amides such as N,N-dimethylformamide and N-methylpyrrolidone; nitro compounds such as nitromethane and nitrobenzene; and water, and these solvents may be used alone or in combination of two or more. The mixing ratio (the compound represented by Formula (VI), (VII), (VIII) or (IX) (molar number))/(the vanadium compound (molar number as vanadium atom)) is preferably 0.001 to 1,000, more preferably 0.01 to 100, further preferably 0.1 to 10, and particularly preferably 0.5 to 2.

The compound represented by Formula (VI) or (VII) can be synthesized, for example, referring to the method described in Tetrahed. Asymm. 1998, 9, pp. 1 to 45; Acc. Chem. Res. 1993, 26, pp. 339 to 345, or Tetrahed. Asymm. 2001, 12, pp. 2851 to 2859. Alternatively, a commercially available product may be used as the compound represented by Formula (VIII) or (IX).

The structure of the complex varies according to the combination of the two compounds and is not particularly limited, but seems to have a structure represented by Formula (VIa), (VIIa), (VIIIa) or (IXa).

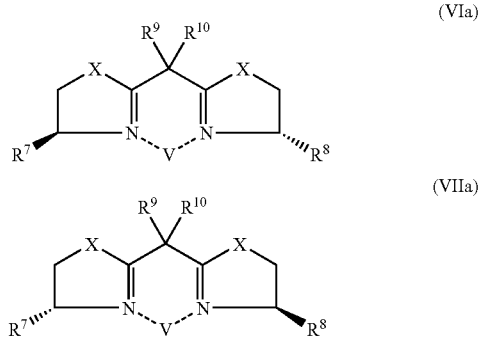

(In formulae (VIa) and (VIIa), $R^7$ and $R^8$ each represent a hydrocarbon group that may be substituted; $R^7$ and $R^8$ may be the same or different from each other; $R^9$ and $R^{10}$ each represent a hydrocarbon group that may be substituted; $R^9$ and $R^{10}$ may be the same or different from each other; $X^1$ and $X^2$ each represent an oxygen or sulfur atom; and $X^1$ and $X^2$ may be the same or different from each other.)

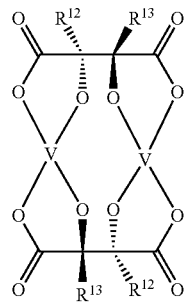

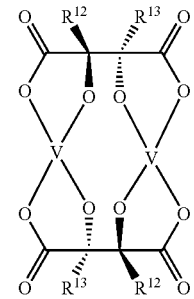

(In formulae (VIIIa) and (IXa), $R^{12}$ and $R^{13}$ each represent a hydrogen atom or a hydrocarbon group that may be substituted; and $R^{12}$ and $R^{13}$ may be the same or different from each other.)

The complex may be formed previously or in situ in the reaction system.

The amount of the vanadium complex catalyst used in the oxidative polymerization is preferably 0.001 to 50 mol %, more preferably 0.01 to 20 mol %, and further preferably 0.02 to 10 mol %, as vanadium atom in all monomers.

In addition, the amount of oxygen used in the oxidative polymerization is usually large excess, and preferably 1 to 1,000 times by mole, more preferably 1 to 100 times by mole, to the all monomers. As the oxygen, a mixed gas with an inert gas may be used, or alternatively, air may be used.

The oxidative polymerization is preferably carried out in a reaction solvent. For example, the oxidative polymerization can be carried out by dissolving the aromatic compound represented by Formula (V) and the vanadium complex in a reaction solvent, and stirring the mixture under oxygen atmosphere. Examples of the reaction solvent include aromatic hydrocarbons, such as benzene, toluene, and xylene; linear or cyclic aliphatic hydrocarbons, such as heptane and cyclohexane; halogenated hydrocarbons, such as chlorobenzene, dichlorobenzene, and dichloromethane; nitriles, such as acetonitrile and benzonitrile; alcohols, such as methanol, ethanol, n-propyl alcohol, and iso-propyl alcohol; ethers, such as dioxane, tetrahydrofuran, and ethylene glycol dimethylether; amides, such as N,N-dimethylformamide and N-methylpyrrolidone; nitro compounds, such as nitromethane and nitrobenzene; and water. As the reaction solvent, are preferably aromatic hydrocarbons, halogenated hydrocarbons, nitriles, alcohols, ethers and nitro compounds. These organic solvents may be used alone or as a mixture of two or more.

The reaction solvent can be normally used at such a ratio that the concentration of all monomers becomes in the range of 0.1 to 90 mass %. The concentration is preferably 1 to 50 mass %, more preferably 2 to 30 mass %, and further preferably 5 to 25 mass %.

The reaction temperature of the oxidative polymerization is not particularly limited, so far as it is in the range allowing the reaction medium to remain liquid state. The temperature range is preferably from 0° C. to 200° C., more preferably from 0° C. to 150° C., and further preferably from 0° C. to 100° C. The reaction time may vary according to the reaction condition, such as the reaction temperature, but it is generally 1 hour or more, preferably 2 to 500 hours.

The aromatic polymer according to the present invention may be used alone or as a composition in combination with another polymer and/or a modifier. Specific examples of components of the polymer in the composition include polyolefins, such as polyethylene, polypropylene, polystyrene, polyvinyl chloride, polymethyl methacrylate, polyvinyl acetate, polyacrylonitrile and copolymers thereof; polyethers, such as polyoxymethylene, polyphenyleneoxide, poly(2,6-dimethyl-1,4-phenyleneoxide), poly(2,5-dimethyl-1,4-phenyleneoxide) and copolymers thereof; polyesters, such as polyethylene terephthalate, polybutylene terephthalate, poly(ethylene-2,6-dinaphthalate), poly(4-oxybenzoate), poly(2-oxy-6-naphthalate) and copolymers thereof; polyamides, such as nylon 6 and nylon 66; polycarbonates; polyphenylene sulfide; polysulfones; polyether sulfones; polyether ether ketones; polyimides; polyether imides; and thermosetting polymers, such as phenol resin, urea resin, melamine resin, and epoxy resin. Specific examples of components of the modifier in the composition include stabilizers, such as 2,6-di-t-butylphenol derivatives and 2,2,6,6-tetramethylpiperidines; flame retardants, such as polyhalides and phosphates; surfactants; and flow modifiers.

According to the present invention, it is possible to provide a new highly optically active aromatic polymer having two hydroxyl groups on each aromatic ring. The polymer according to the present invention, which has many hydroxyl groups in the main chain, is capable of capturing metal ions, allowing recognition of biological substance and conversion to a functional group, and the like. In addition, with its various functions and high optical activity, the polymer can be applied, for example, as an optical conversion device or an optical switch.

EXAMPLES

The present invention will be described in more detail based on examples given below, but the invention is not meant to be limited by these.

Example 1

Were dissolved 0.175 mmol of the following compound (C) described in Macromolecules, 36, 2003, pp. 2604 to 2608 and 0.175 mmol of oxovanadium sulfate (IV) in 5 mL of methylene chloride/methanol (volume ratio: 7/1), allowing formation of a vanadium complex. Thereto, 1.75 mmol of 2,3-dihydroxynaphthalene was added, and the mixture was stirred under oxygen atmosphere at room temperature for 24 hours, allowing polymerization reaction, to synthesize poly(2,3-hydroxy-1,4-naphthylene). After the reaction, the solvent was removed by vaporization; acetyl chloride (17.5 mmol) and pyridine (17.5 mmol) were added; and the mixture was stirred under nitrogen atmosphere at room temperature for 12 hours. Then, a large excess amount of methanol was added thereto, and precipitates were collected by filtration, washed and dried, to give a polymer. The polymer obtained was identified to be poly(2,3-diacetoxy-1,4-naphthylene) (yield: 58%).

Was dissolved 0.003 g of the acetylated polymer (the molecular weight of the repeating unit of the acetylated polymer was 242, equivalent to 0.000124 dmol of the repeating unit) in chloroform, to give 3.0 mL of a solution. The circular dichroism spectrum of the solution was determined (using an instrument, JASCO J-720 L (trade name) manufactured by JASCO Corp., optical path length: 0.01 cm). As a result, it was showed that the absolute value of the molar ellipticity per unit mole of the repeating unit of the acetylated polymer (degree·cm$^{-2}$·dmol$^{-1}$) reached maximum at a wavelength of approximately 230 nm, and the absolute value was 132,000.

In addition, using a gel-permeation chromatography (Instrument: JASCO PU-2080 plus (trade name) and JASCO UV-2075 plus (trade name) manufactured by JASCO Corp., column: Shodex GPC KF-803Lx and GPC KF-806Lx manufactured by Showa Denko K.K., development solvent: tetrahydrofuran, temperature: room temperature), the number-average molecular weight, as a value equivalent to polystyrene, of the acetylated polymer was determined. As a result, the number-average molecular weight was 2,700 (this means that the molecular weight of the repeating unit of the acetylated polymer was 242, and the number average degree of polymerization was 11).

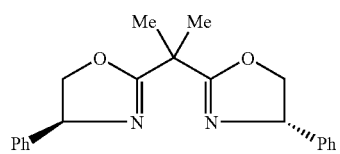

(C)

Comparative Example 1

The circular dichroism spectrum of the acetylated product of poly(2,3-hydroxy-1,4-naphthylene), which was prepared by using the copper complex of the following compound (D) described in Table 2, entry 8 of Macromolecules, 36, 2003, p. 2604 to 2608 as a catalyst, was determined in the same manner as in Example 1. As a result, it was showed that the absolute value of the molar ellipticity per unit mole of the repeating unit reached maximum at a wavelength of approximately 230 nm, and the absolute value was 43,000 (degree·cm$^{-2}$·dmol$^{-1}$). The number-average molecular weight thereof determined in the same manner as in Example 1 was 9,300 (number average degree of polymerization: 38).

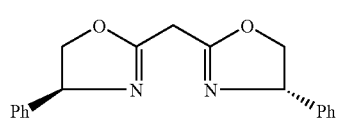

(D)

Example 2

Was mixed 0.125 mmol of the following commercially available compound (E) and 0.125 mmol of vanadium oxide stearate (IV) in 1.79 mL of tetrahydrofuran. Thereto, 1.25 mmol of 2,3-dihydroxynaphthalene was added, and the mixture was stirred under oxygen atmosphere at room temperature for 48 hours allowing polymerization reaction, to give poly(2,3-dihydroxy-1,4-naphthylene). After the reaction, the solvent was removed by vaporization; acetyl chloride (12.5 mmol) and pyridine (12.5 mmol) were added; and the mixture was stirred under nitrogen atmosphere at room temperature for 12 hours. Then, a large excess amount of methanol was added thereto, and precipitates were collected by filtration, washed and dried, to give a polymer. The polymer obtained was identified to be poly(2,3-dihydroxy-1,4-naphthylene) (yield: 30%).

The circular dichroism spectrum of the acetylated polymer was determined in the same manner as in Example 1, except that tetrahydrofuran was used as the solvent. As a result, it was showed that the absolute value of the molar ellipticity per unit mole of the repeating unit of the acetylated polymer reached maximum at a wavelength of approximately 230 nm, and the absolute value was 207,180 (degree·cm$^{-2}$·dmol$^{-1}$).

In addition, using a gel-permeation chromatography (Instrument: Pump L-7100 (trade name) manufactured by Hitachi and JASCORI-930 (trade name) manufactured by JASCO Corp., column: TSKgel G3000Hx and TSKgel G7000Hx manufactured by Tosoh Corporation, development solvent: N,N-dimethylformamide (0.01 M lithium bromide), temperature: 40° C.), the number-average molecular weight, as a value equivalent to polystyrene, was determined. As a result, the number-average molecular weight thereof was 6,100 (number average degree of polymerization: 25).

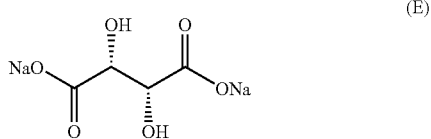

(E)

INDUSTRIAL APPLICABILITY

According to the present invention, it is possible to provide a new highly optically active aromatic polymer having two hydroxyl groups on each aromatic ring. The polymer according to the present invention, which has many hydroxyl groups in the main chain, is capable of capturing metal ions, allowing recognition of biological substance and conversion to a functional group, and the like. In addition, with its various functions and high optical activity, the polymer can be applied, for example, as an optical conversion device or an optical switch.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An aromatic polymer, comprising a repeating unit represented by Formula (I),
   wherein the polymer has the following properties (A1) and (B1):
   (A1) the number average degree of polymerization of an acetylated product provided by acetylation of the hydroxyl groups of the polymer is 3 or more, and
   (B1) at a wavelength where an absolute value of molar ellipticity (degree·cm$^{-2}$dmol$^{-1}$) per mole of the repeating unit of the acetylated product in a circular dichroism spectrum of the acetylated product reaches maximum in a wavelength range of from 200 to 350 nm, the absolute value is 50,000 or more:

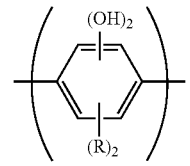

(I)

wherein R represents a hydrocarbon group that may be substituted, a hydrocarbon-oxy group that may be substituted, a hydrocarbon-mercapto group that may be substituted, or a hydrocarbon-amino group that may be substituted; the two R's may be the same or different from each other, or alternatively may bind to each other to form a ring; and the repeating unit represented by Formula (I) has no symmetrical plane that has two binding sites and that is perpendicular for the benzene ring.

2. The aromatic polymer according to claim 1, wherein the repeating unit represented by Formula (I) is a repeating unit represented by any one of Formulae (II) to (IV):

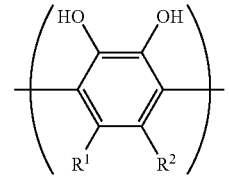

(II)

wherein $R^1$ and $R^2$ each represent a hydrocarbon group that may be substituted, a hydrocarbon-oxy group that may be substituted, a hydrocarbon-mercapto group that may be substituted, or a hydrocarbon-amino group that may be substituted; and $R^1$ and $R^2$ are different from each other, or alternatively may bind to each other to form a ring;

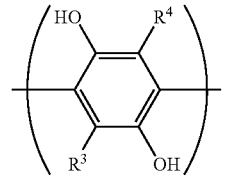

(III)

wherein $R^3$ and $R^4$ each represent a hydrocarbon group that may be substituted, a hydrocarbon-oxy group that may be substituted, a hydrocarbon-mercapto group that may be substituted, or a hydrocarbon-amino group that may be substituted; and $R^3$ and $R^4$ are different from each other; and

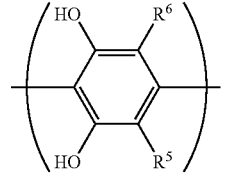

(IV)

wherein $R^5$ and $R^6$ each represent a hydrocarbon group that may be substituted, a hydrocarbon-oxy group that may be substituted, a hydrocarbon-mercapto group that may be substituted, or a hydrocarbon-amino group that may be substituted; and $R^5$ and $R^6$ are different from each other.

3. The aromatic polymer according to claim 1, wherein the ratio of the repeating unit represented by Formula (I) in the aromatic polymer is 95 unit % or more.

4. An acetylated product, comprising a repeating unit represented by Formula (Ia),
wherein the acetylated product has the following properties (A2) and (B2):
(A2) the number average degree of polymerization is 3 or more, and
(B2) at a wavelength where an absolute value of molar ellipticity (degree·cm$^{-2}$dmol$^{-1}$) per mole of the repeating unit of the acetylated product in a circular dichroism spectrum reaches maximum in a wavelength range of from 200 to 350 nm, the absolute value is 50,000 or more:

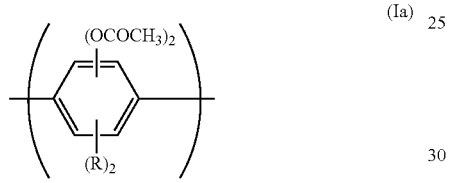
(Ia)

wherein R represents a hydrocarbon group that may be substituted, a hydrocarbon-oxy group that may be substituted, a hydrocarbon-mercapto group that may be substituted, or a hydrocarbon-amino group that may be substituted; the two R's may be the same or different from each other, or alternatively may bind to each other to form a ring; and the repeating unit represented by Formula (Ia) has no symmetrical plane that has two binding sites and that is perpendicular for the benzene ring.

5. The acetylated product according to in claim 4, wherein the number average degree of polymerization is 5 to 1,000.

6. The acetylated product according to claim 4, wherein, at the wavelength where an absolute value of molar ellipticity (degree·cm$^{-2}$dmol$^{-1}$) per mole of the repeating unit of the acetylated product in a circular dichroism spectrum reaches maximum in a wavelength range of from 200 to 350 nm, the absolute value is 65,000 to 300,000.

7. A method of producing the aromatic polymer according to claim 1, which comprises oxidatively polymerizing an aromatic compound represented by Formula (V) with oxygen, by using a complex as a catalyst, wherein the complex comprises a compound represented by Formula (VI), (VII), (VIII) or (IX) and a vanadium compound:

(V)

wherein R' has the same meaning as that of R in Formula (I);

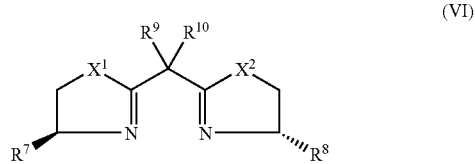
(VI)

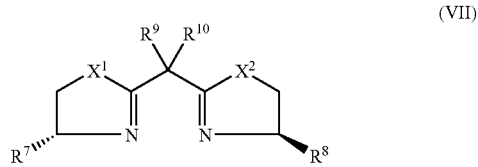
(VII)

wherein, in Formulae (VI) and (VII), $R^7$ and $R^8$ each represent a hydrocarbon group that may be substituted; $R^7$ and $R^8$ may be the same or different from each other; $R^9$ and $R^{10}$ each represent a hydrocarbon group that may be substituted; $R^9$ and $R^{10}$ may be the same or different from each other; $X^1$ and $X^2$ each represent an oxygen or sulfur atom; and $X^1$ and $X^2$ may be the same or different from each other; and

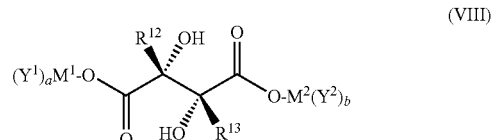
(VIII)

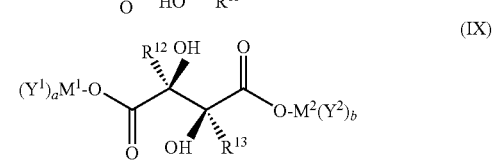
(IX)

wherein, in Formulae (VIII) and (IX), $R^{12}$ and $R^{13}$ each represent a hydrogen atom or a hydrocarbon group that may be substituted; $R^{12}$ and $R^{13}$ may be the same or different from each other; $M^1$ and $M^2$ each represent a metal ion; $M^1$ and $M^2$ may be the same or different from each other; $Y^1$ and $Y^2$ each represent a counter anion; $Y^1$ and $Y^2$ may be the same or different from each other; a and b each are an integer of 0 or more; and a and b may be the same or different from each other.

8. The method of producing the aromatic polymer according to claim 7, wherein, in Formulae (VI) and (VII), $R^7$ and $R^8$ each independently represent a methyl group, an ethyl group, a propyl group, an isopropyl group, a t-butyl group or a phenyl group; $R^9$ and $R^{10}$ each represent a methyl group; and $X^1$ and $X^2$ each represent an oxygen atom.

9. The method of producing the aromatic polymer according to claim 7, wherein, in Formulae (VIII) and (IX), $R^{12}$ and $R^{13}$ each independently represent a hydrogen atom or a methyl group; $M^1$ and $M^2$ each independently represent an ion of Li, Na or K; and $Y^1$ and $Y^2$ each independently represent a chloride ion, a bromide ion, a sulfate ion or a nitrate ion.

10. The method of producing the aromatic polymer according to claim 7, wherein the vanadium compound is an oxovanadium (IV) compound or an oxovanadium (V) compound.

11. The method of producing the aromatic polymer according to claim 7, wherein the ratio of the aromatic compound represented by Formula (V) is 95 mol % or more, with respect to all monomers.

12. The aromatic polymer according to claim 1, which is produced by a method, which comprises oxidatively polymerizing an aromatic compound represented by Formula (V) with oxygen, by using a complex as a catalyst, wherein the complex comprises a compound represented by Formula (VI), (VII), (VIII) or (IX) and a vanadium compound:

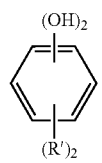
(V)

wherein R' has the same meaning as that of R in Formula (I);

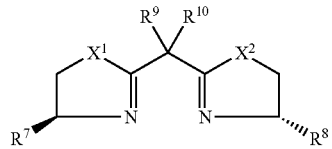
(VI)

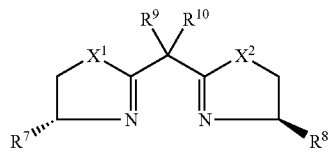
(VII)

wherein, in Formulae (VI) and (VII), $R^7$ and $R^8$ each represent a hydrocarbon group that may be substituted; $R^7$ and $R^8$ may be the same or different from each other; $R^9$ and $R^{10}$ each represent a hydrocarbon group that may be substituted; $R^9$ and $R^{10}$ may be the same or different from each other; $X^1$ and $X^2$ each represent an oxygen or sulfur atom; and $X^1$ and $X^2$ may be the same or different from each other; and

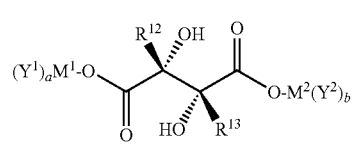
(VIII)

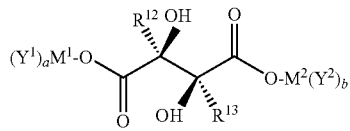
(IX)

wherein, in Formulae (VIII) and (IX), $R^{12}$ and $R^{13}$ each represent a hydrogen atom or a hydrocarbon group that may be substituted; $R^{12}$ and $R^{13}$ may be the same or different from each other; $M^1$ and $M^2$ each represent a metal ion; $M^1$ and $M^2$ may be the same or different from each other; $Y^1$ and $Y^2$ each represent a counter anion; $Y^1$ and $Y^2$ may be the same or different from each other; a and b each are an integer of 0 or more; and a and b may be the same or different from each other.

* * * * *